United States Patent
Uei et al.

(10) Patent No.: US 11,424,685 B2
(45) Date of Patent: Aug. 23, 2022

(54) RESONANCE TYPE POWER SUPPLY DEVICE

(71) Applicant: Hitachi Industrial Equipment Systems Co., Ltd., Tokyo (JP)

(72) Inventors: Yusuke Uei, Tokyo (JP); Takuya Ishigaki, Tokyo (JP); Tetsuo Yanada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 14 days.

(21) Appl. No.: 17/258,684

(22) PCT Filed: Jun. 27, 2019

(86) PCT No.: PCT/JP2019/025681
§ 371 (c)(1),
(2) Date: Jan. 7, 2021

(87) PCT Pub. No.: WO2020/070931
PCT Pub. Date: Apr. 9, 2020

(65) Prior Publication Data
US 2021/0273568 A1  Sep. 2, 2021

(30) Foreign Application Priority Data

Oct. 4, 2018 (JP) .............................. JP2018-188769

(51) Int. Cl.
*H02M 3/335* (2006.01)
*H02M 3/00* (2006.01)

(52) U.S. Cl.
CPC ......... *H02M 3/33569* (2013.01); *H02M 3/01* (2021.05); *H02M 3/33573* (2021.05)

(58) Field of Classification Search
CPC ............. H02M 3/335; H02M 3/33569; H02M 3/33573; H02M 3/01
See application file for complete search history.

(56) References Cited

U.S. PATENT DOCUMENTS

| | | |
|---|---|---|
| 2015/0023066 A1 | 1/2015 | Kawashima |
| 2015/0109830 A1 | 4/2015 | Xu et al. |

(Continued)

FOREIGN PATENT DOCUMENTS

| | | |
|---|---|---|
| JP | 2014-54038 A | 3/2014 |
| JP | 2015-2579 A | 1/2015 |
| JP | 2015-39284 A | 2/2015 |

OTHER PUBLICATIONS

International Search Report (PCT/ISA/210) issued in PCT Application No. PCT/JP2019/025681 dated Aug. 27, 2019 with English translation (two (2) pages).

(Continued)

*Primary Examiner* — Gary L Laxton
(74) *Attorney, Agent, or Firm* — Crowell & Moring LLP

(57) ABSTRACT

A resonance type power supply device includes: a power supply main circuit having a transformer, a resonance element connected on a primary side of the transformer, and a plurality of switching elements connected to the resonance element; and a power supply control circuit switching the plurality of switching elements in the power supply main circuit with a predetermined switching frequency, in which the power supply control circuit includes: a voltage controller outputting a current command value from a reference voltage, an output voltage of the power supply main circuit, and a voltage control gain; a current controller calculating a reference current, a current flowing on a secondary side of the transformer, and a current control gain; a gain calculator outputting the voltage control gain and the current control gain; and a control signal generator controlling the plurality of switching elements based on the switching frequency outputted by the current controller, and the gain calculator outputs the voltage control gain or current control gain that (Continued)

is proportional to the switching frequency outputted by the current controller.

6 Claims, 15 Drawing Sheets

(56) References Cited

U.S. PATENT DOCUMENTS

2015/0198634 A1   7/2015  Brinlee
2019/0260287 A1*  8/2019  Son .................... H02M 1/4208
2020/0112244 A1*  4/2020  Chen ................... H02M 3/3376

OTHER PUBLICATIONS

Japanese-language Written Opinion (PCT/ISA/237) issued in PCT Application No. PCT/JP2019/025681 dated Aug. 27, 2019 (four (4) pages).
German-language Office Action issued in German Application No. 11 2019 003 170.8 dated May 13, 2022 with partial English translation (12 pages).
S. Zong et al.: Theoretical Evaluation of Stability Improvement Brought by Resonant Current Loop for Paralleled LLC Converters. In: IEEE Transactions on Industrial Electronics, vol. 62, 2015, Issue: 7, 4170-4180 dated Jul. 2015 (12 pages).
S. Kang et al.: Gain-scheduled control using voltage controlled oscillator with variable gain fora LLC resonant converter. In: 2014 IEEE Energy Conversion Congress and Exposition (ECCE), 2014, 4466- 4471 (six (6) pages).

* cited by examiner

| Fsw | AVRGain | ACRGain |
|---|---|---|
| Fsw=Fsw_max | AVRGainA | ACRGainA |
| Fsw_max>Fsw≧Fsw_C | AVRGainC | ACRGainC |
| Fsw_C>Fsw≧Fsw_D | AVRGainD | ACRGainD |
| Fsw_D>Fsw≧Fsw_E | AVRGainE | ACRGainE |
| Fsw_E>Fsw≧Fsw_min | AVRGainB | ACRGainB |

RESONANCE TYPE POWER SUPPLY DEVICE

TECHNICAL FIELD

The present invention relates to a resonance type power supply device.

BACKGROUND ART

A resonance type power supply device is used for, for example, industrial equipment, information equipment, and the like. The resonance type power supply device is provided with an LLC current resonance type circuit. The LLC current resonance type circuit uses a resonance phenomenon to flow a sinusoidal current, and turns off a switching element at the timing when the current becomes small. This brings realization of a highly efficient resonance type power supply device with a small switching loss.

Such a resonance type power supply device adjusts a switching frequency to control an output voltage. However, when a ratio of an input voltage to the output voltage in a specification range (hereinafter referred to as "input/output voltage ratio") covers a widespread area due to characteristics of the LLC current resonance type circuit, power supply characteristics may deteriorate due to a control gain related to the output voltage.

In contrast, Patent Document 1 discloses a device capable of suppressing deterioration of power supply characteristics by adjusting a proportional gain from a voltage value of an output voltage and an error of a reference voltage source.

According to Patent Document 1, a switching power supply 1 having a LLC current resonance type circuit and switch elements Q1, Q2 detects an error between the voltage value of the output voltage and a target value of an output voltage determined by a power supply voltage of the reference voltage source Vref, and carries a current, which depends on a detection result, through a phototransistor PC2. Further, a control circuit controls the proportional gain depending on an oscillatory frequency of the switching power supply, and controls on/off frequencies of the switch elements Q1, Q2 based on the controlled proportional gain and a voltage of a terminal P1. This configuration brings suppression of fluctuation of the proportional gain depending on to fluctuation of an input voltage.

RELATED ART DOCUMENTS

Patent Documents

Patent Document 1: JP 2014-54038 A

SUMMARY OF THE INVENTION

Problems to be Solved by the Invention

Patent Document 1 discloses that the switching power supply described in Patent Document 1 controls the proportional gain depending on an oscillatory frequency of an error voltage between the voltage value of the output voltage and the target value of the output voltage determined by the power supply voltage of the reference voltage Vref.

However, controlling the proportional gain depending on the oscillatory frequency of the error voltage means to lower the proportional gain after occurrence of oscillation and to increase the proportional gain when the oscillation is stopped.

Consequently, such a problem cannot be solved as to supply a stable power supply without generating the oscillation of the output voltage as much as possible in the first place.

Means for Solving the Problems

A brief description of typical inventions disclosed in the present application is as follows.

A resonance type power supply device according to a typical embodiment of the present invention includes: a power supply main circuit having a transformer, a resonance element connected on a primary side of the transformer, and a plurality of switching elements connected to the resonance element; and a power supply control circuit switching the plurality of switching elements in the power supply main circuit with a predetermined switching frequency, in which the power supply control circuit includes: a voltage controller outputting a current command value from a reference voltage, an output voltage of the power supply main circuit, and a voltage control gain; a current controller calculating a reference current, a current flowing on a secondary side of the transformer, and a current control gain; a gain calculator outputting the voltage control gain and the current control gain; and a control signal generator controlling the plurality of switching elements based on the switching frequency outputted by the current controller, and the gain calculator outputs the voltage control gain or current control gain that is proportional to the switching frequency outputted by the current controller.

Effects of the Invention

According to a typical embodiment of the present invention, it is possible to suppress the oscillation of the output voltage and improve the power supply characteristics.

DETAILED DESCRIPTION OF PREFERRED EMBODIMENTS

Figure 1:
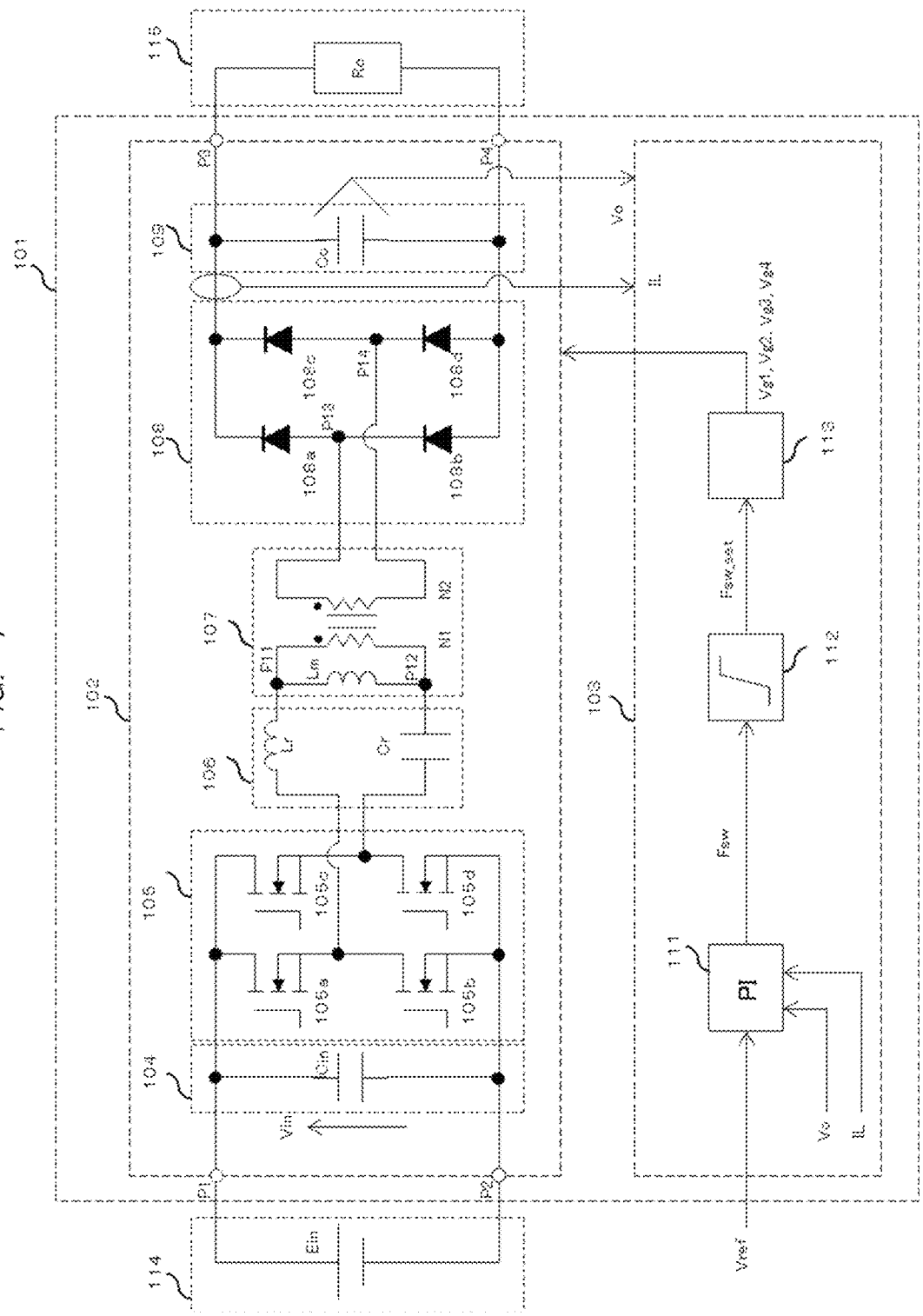
FIG. 1 is a view showing an example of a configuration of a resonance type power source device according to an embodiment which applies the present invention.

Hereinafter, embodiments of the present invention will be described in detail with reference to the drawings. Incidentally, through all the figures for explaining the embodiments, the same reference numerals are denoted to the same parts in principle, and repetitive descriptions thereof will be omitted.

First Embodiment

<Configuration of Resonance Type Power Supply Device>

<<Configuration of Power Supply Main Circuit>>

FIG. 1 is a view showing an example of a configuration of a resonance type power supply device according to a first embodiment which applies the present invention. As shown in FIG. 1, a resonance type power supply device 101 includes a power supply main circuit 102 and a power supply control circuit 103. The resonance type power supply device 101 converts, into a predetermined voltage, a voltage inputted from an input power supply 114 externally provided, and outputs the converted voltage to a load 115.

A high potential side end portion of the input power supply 114 is connected to one input terminal P1 of the power supply main circuit 102 described later, and a low potential side end portion of the input power supply 114 is the other input terminal P2 of the power supply main circuit 102. High potential side and low potential side end portions of the load 115 are connected to output terminals P3, P4 of the power supply main circuit 102, respectively.

As shown in FIG. 1, the power supply main circuit 102 includes an input side capacitor 104, a primary side semiconductor element 105, a resonance element 106, a transformer 107, a secondary side semiconductor element 108, and an output side capacitor 109.

The input side capacitor 104 is a capacitor for absorbing voltage ripple. As shown in FIG. 1, a pair of electrodes of the input side capacitor 104 are connected to the input terminals P1, P2 of the power supply main circuit 102, respectively. A predetermined input voltage Vin is applied to the input side capacitor 104 by the input power supply 114.

The primary side semiconductor element 105 switches a voltage inputted to the resonance element 106 with a predetermined switching frequency. As shown in FIG. 1, the primary side semiconductor element 105 is composed of a plurality of switching elements 105a to 105d each of which is composed of a MOSFET such as a NMOS (N-Channel MOS). As shown in FIG. 1, these switching elements 105a to 105d are connected in a bridge shape.

For example, one end portion of the switching element 105a and one end portion of the switching element 105c are connected to the one input terminal P1 of the power supply main circuit 102, as shown in FIG. 1. One end portion of the switching element 105b and one end portion of the switching element 105d are connected to the other input terminal P2 of the power main circuit 102. The other end portion of the switching element 105a and the other end portion of the switching element 105b are connected to a resonance inductor 106a of the resonance element 106 described later. The other end portion of the switching element 105c and the other end portion of the switching element 105d are connected to a resonance capacitor 106b of the resonance element 106. Gates of the switching elements 105a to 105d are respectively connected to a switching control signal generator 113 described later.

Switching control signals Vg1 to Vg4 outputted from the power supply control circuit 103 are inputted to the gates of the switching elements 105a to 105d, respectively. The switching elements 105a to 105d are turned on/off based on the switching control signals Vg1 to Vg4 corresponding to them. For example, if the switching element is composed of an NMOS, the switching element becomes an on-state (turned on) when a high-level switching control signal is inputted to the gate. Meanwhile, when a low-level switching control signal is inputted to the gate, the switching element becomes an off-state (turned off).

The switching elements 105a to 105d are repeatedly turned on/off based on the switching control signals Vg1 to Vg4, and input a pulsed voltage to the resonance element 106. For example, when the switching elements 105a, 105d are the on-states and the switching elements 105b, 105c are the off-states, a predetermined voltage (Vin) is inputted to the resonance element 106. Meanwhile, when the switching elements 105a, 105d are the off-states and the switching elements 105b, 105c are the on-states, a predetermined voltage (−Vin) is inputted to the resonance element 106. By repeating these operations, a pulsed voltage having a predetermined amplitude (Vin) is inputted to the resonance element 106.

As shown in FIG. 1, the resonance element 106 includes a resonance inductor 106a and a resonance capacitor 106b. As shown in FIG. 1, one end portion of the resonance inductor 106a is connected to the other end portion of the switching element 105a and the other end portion of the switching element 105b. Further, as shown in FIG. 1, the other end portion of the resonance inductor 106a is connected to the transformer 107 via one input terminal P11 of the transformer 107.

As shown in FIG. 1, one end portion of the resonance capacitor 106b is connected to the transformer 107 via the other input terminal P12 of the transformer 107. Further, as shown in FIG. 1, the other end portion of the resonance capacitor 106b is connected to the other end portion of the switching element 105c and the other end portion of the switching element 105d.

The resonance inductor 106a and the resonance capacitor 106b are connected in series. Incidentally, it is assumed that resonance inductance Lr of the resonance inductor 106a includes leakage inductance (not shown) of the transformer 107. The resonance inductance and the leakage inductance are in a series relationship.

In FIG. 1, the resonance inductor 106a and the resonance capacitor 106b are arranged separately via the transformer 107, but are not limited to such arrangement. For example, the resonance inductor 106a and the resonance capacitor 106b may be arranged on a resonance inductor 106a side shown in FIG. 1 or may be arranged on a resonance capacitor 106b side. The pulsed voltage described above is inputted to the resonance element 106 from the primary side semiconductor element 105. When the pulsed voltage is inputted, a sinusoidal current having a resonance frequency Fo that is defined on the basis of the resonance inductance Lr and the resonance capacitance Cr flows through the resonance element 106 and the transformer 107.

In the transformer 107, as shown in FIG. 1, the number of turns of a primary side coil is N1, the number of turns of a secondary side coil is N2, and exciting inductance is Lm. The transformer 107 converts the input voltage Vin, which is inputted to the primary side via the resonance element 106, into a predetermined output voltage (Vo) on the secondary side, and outputs the converted output voltage (Vo) outside the power supply main circuit 102.

The secondary side semiconductor element 108 is an element that rectifies a current on the secondary side of the transformer 107. As shown in FIG. 1, the secondary side semiconductor element includes a plurality of diodes 108a to 108d. As shown in FIG. 1, these diodes 108a to 108d are connected in a bridge shape. For example, an anode side end portion of the diode 108a and a cathode side end portion of the diode 108b are connected to the one output terminal P13 of the transformer 107, as shown in FIG. 1. An anode side end portion of the diode 108c and a cathode side end portion of the diode 108d are connected to the other output terminal P14 of the transformer 107, as shown in FIG. 1.

As shown in FIG. 1, a cathode side end portion of the diode 108a and a cathode side end portion of the diode 108c are connected to one electrode of the output side capacitor 109 and the one output terminal P3 of the power supply main circuit 102. An anode side end portion of the diode 108b and an anode side end portion of the diode 108d are connected to the other electrode of the output side capacitor 109 and the other output terminal P4 of the power supply main circuit 102, as shown in FIG. 1.

When a voltage of the output terminal P13 is higher than a voltage of the output terminal P14, a current on the secondary side of the transformer 107 is rectified by the diodes 108a, 108d. In contrast, when the voltage of the output terminal P14 is higher than the voltage of the output terminal P13, a current on the secondary side of the transformer 14 is rectified by the diodes 108c, 108b.

The output side capacitor 109 is a capacitor for stabilizing the output voltage. The power supply main circuit 102 detects a voltage between both electrodes of the output side capacitor 109 (voltage between the output terminals P3, P4) as an output voltage (Vo), and outputs information of the detected output voltage (Vo) to the power supply control circuit 103. Further, the power supply main circuit 102 outputs the output voltage (Vo) to the load 115 via the output terminals P3, P4.

The power supply main circuit 102 detects an output current IL flowing through the power supply main circuit 102, and outputs information of the detected output current IL to a power supply control block 103. Incidentally, in an example shown in FIG. 1, the power supply main circuit 102 detects the current flowing through the secondary side semiconductor element 108 as the output current IL, but, for example, a current flowing through the resonance element 106 or/and the primary side semiconductor element 105 may be detected as the output current IL.

<<Configuration of Power Supply Control Circuit>>

As shown in FIG. 1, a power supply control block 103 includes a control quantity calculating circuit 111, a switching frequency upper/lower limit value adjuster 112, and a switching control signal generator 113.

As shown in FIG. 1, inputted in the control quantity computing block 103 are: information on the output voltage (Vo) detected by the power supply main circuit 102; a reference voltage (Vref) which is a target value of the output voltage (Vo); and an output current IL detected by the power supply main circuit 102. The reference voltage (Vref) is inputted from an external device. The external device may be provided, for example, inside an apparatus having the resonance type power supply device 101, or may be provided outside an apparatus having the resonance type power supply device 101.

The control quantity computing circuit 111 calculates a switching frequency (Fsw) from the reference voltage (Vref), the inputted output voltage (Vo), and the output current IL detected by the power supply main circuit 102, and inputs it to the switching frequency upper/lower limit value adjuster 112.

Further, the control quantity computing circuit 111 determines a control quantity required for adjusting the output voltage (Vo) based on the output voltage (Vo) inputted from the power supply main circuit 102 and the reference voltage (Vref) inputted from the external device. The control quantity is calculated to adjust the output voltage (Vo) to the reference voltage (Vref).

The switching frequency upper/lower limit value adjuster 112 adjusts the switching frequency (Fsw) outputted from the control quantity computing circuit 111 so as to fall within a range from a switching frequency lower limit value (Fsw_min) as a lower limit value of the switching frequency to a switching frequency upper limit value as an upper limit value (Fsw_max) of the switching frequency. For example, when the switching frequency (Fsw) is larger than the switching frequency upper limit value (Fsw_max), the switching frequency upper/lower limit value adjuster 112 sets the switching frequency (Fsw) to the switching frequency upper limit value (Fsw_max). When the switching frequency (Fsw) is smaller than the switching frequency lower limit value (Fsw_min), the switching frequency upper/lower limit value adjuster 112 sets the switching frequency (Fsw) to the switching frequency lower limit value (Fsw_min).

The switching frequency lower limit value (Fsw_min) and the switching frequency upper limit value (Fsw_max) are values set in advance.

The switching control signal generator 113 generates switching control signals Vg1 to Vg4 for each of the switching elements 105a to 105d based on the switching frequency (Fsw) outputted from the switching frequency upper/lower limit value adjuster 112.

For example, the switching control signal generator 113 generates switching control signals Vg1 to Vg4 for each of the switching elements 105a to 105d based on the newly set switching frequency (Fsw). Like this, control for adjusting the output voltage (Vo) only by the switching frequency (Fsw) may be called frequency control.

<Adjustment of Switching Frequency>

Next, an operation of a control quantity computing unit 111 that computes the switching (Fsw) will be described.

Figure 2:
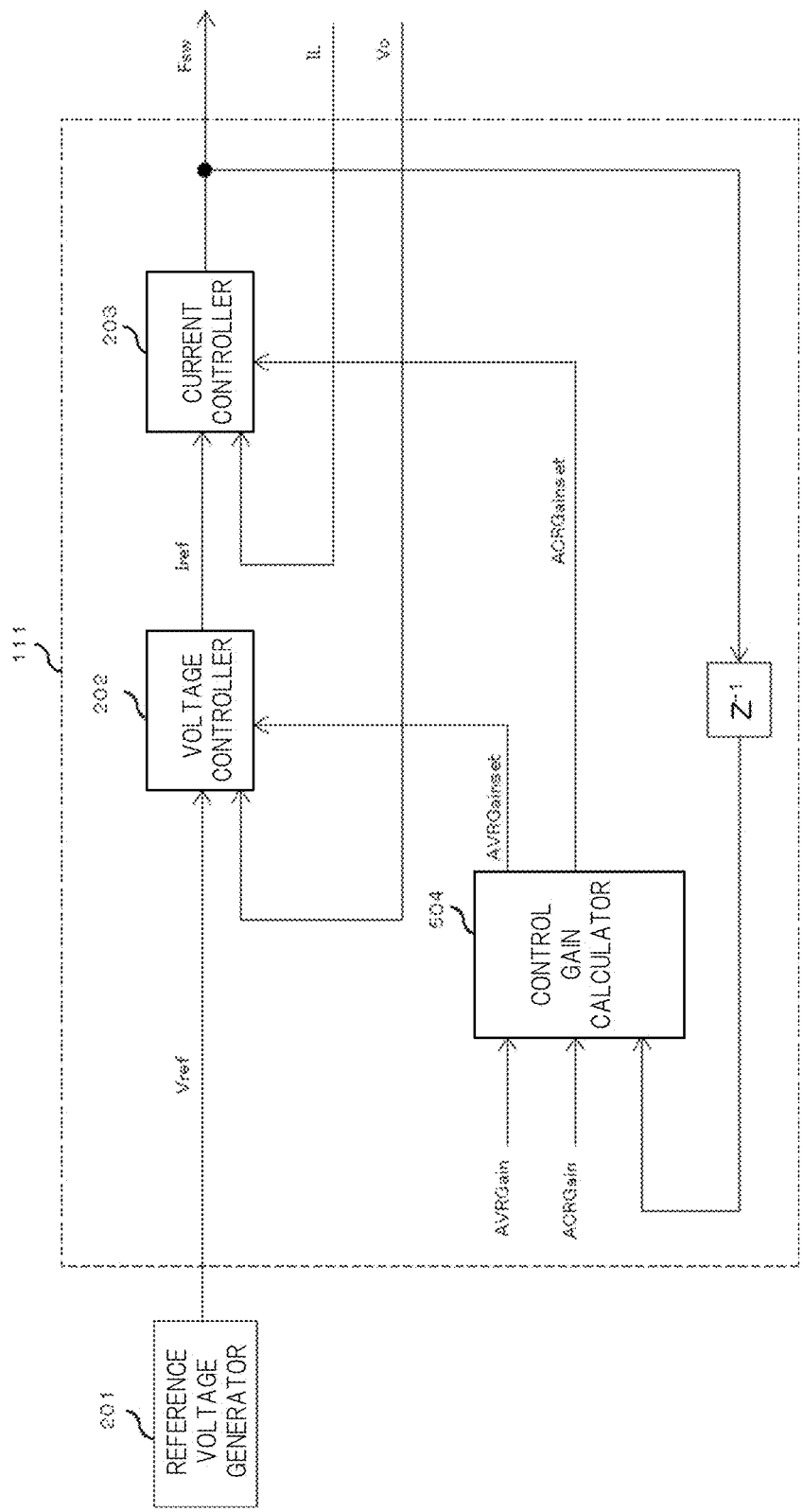
FIG. 2 is a view showing an example of a control block of a control quantity computing unit according to an embodiment which applies the present invention.

FIG. 2 is a control block diagram in the control quantity computing unit 111 of the resonance type power supply device which applies the present invention.

A voltage controller 202 calculates a voltage difference (ΔV) between the output voltage (Vo) and the reference voltage (Vref), and calculates a current command (Iref) from the calculated voltage difference (ΔV) and a voltage control gain (AVR Gainset). The voltage control gain (AVR Gainset) is outputted from a control gain calculator 504. Details of the control gain calculator 504 will be described later.

When the output voltage (Vo) is larger than the reference voltage (Vref), the voltage controller 202 performs an arithmetic processing so that the current command (Iref) to be outputted becomes smaller. When the output voltage (Vo) is smaller than the reference voltage (Vref), the voltage controller 202 performs an arithmetic processing so that the current command (Iref) to be outputted becomes large.

A current controller 203 calculates a current difference (ΔI) between the current command (Iref) outputted from the voltage controller 202 and the output current (IL) flowing through the power supply main circuit 102, and calculates the switching frequency (Fsw) from the calculated current difference (ΔI) and a current control gain (ACRGainset). The current control gain (ACRGainset) is outputted from the control gain calculator 504. Details of the control gain calculator 504 will be described later.

When the output current (IL) is larger than the current command (Iref), the current controller 203 performs an arithmetic processing so that the switching frequency (Fsw) to be outputted becomes large in order to suppress a current supplied to the output capacitor 109. On the contrary, when the output current (IL) is smaller than the current command (Iref), the current controller 203 performs an arithmetic processing so that the switching frequency (Fsw) to be outputted becomes smaller in order to increase a current supplied to the output capacitor.

Next, voltage characteristics due to the control gain in the resonance type power supply device will be described. The control gain Gain referred to here is a control quantity for each controller. In a case of the control gain related to the voltage controller, the control gain Gain is AVRGain. In a case of the control gain related to the current controller, the control gain Gain is ACRGin. These are integrated and referred to as "control gain" for brevity's sake.

Figure 3A:
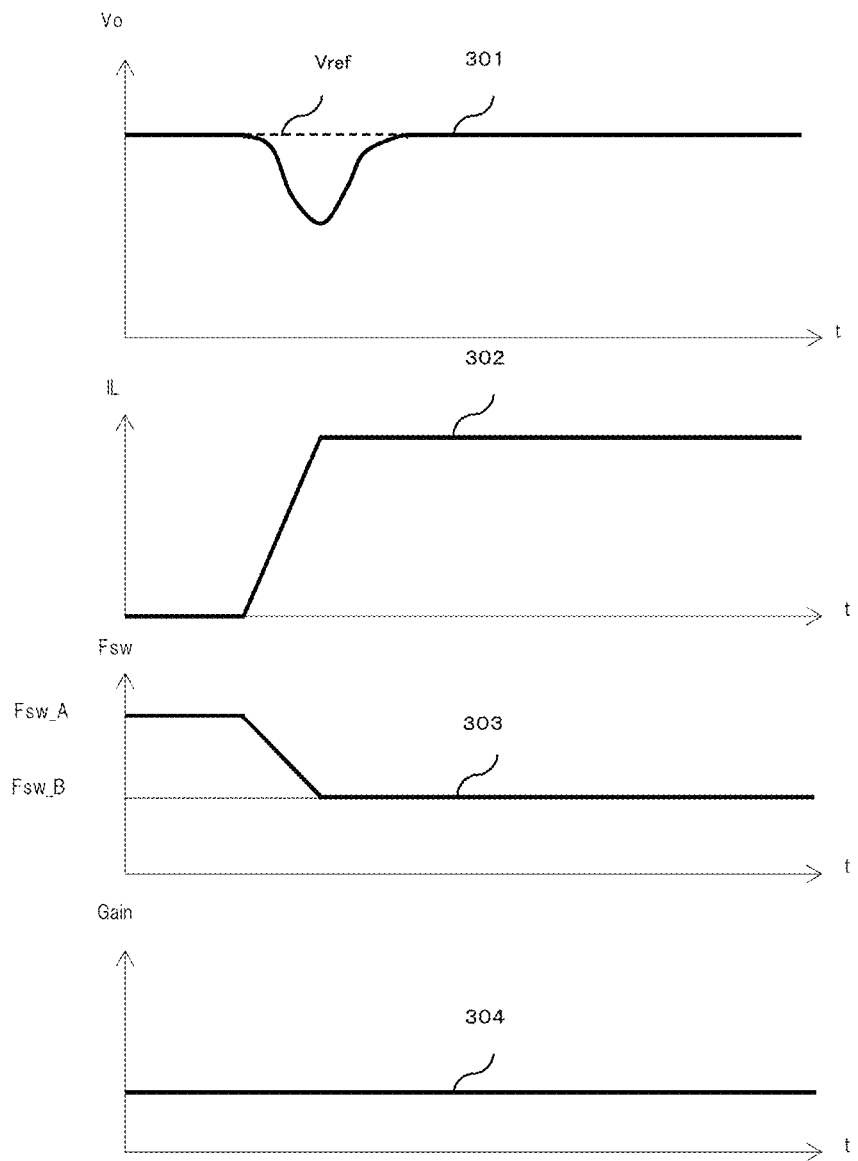
FIG. 3A is a view showing examples of a voltage, a current, and a switching frequency operation when a control gain is a constant value.
Figure 3B:
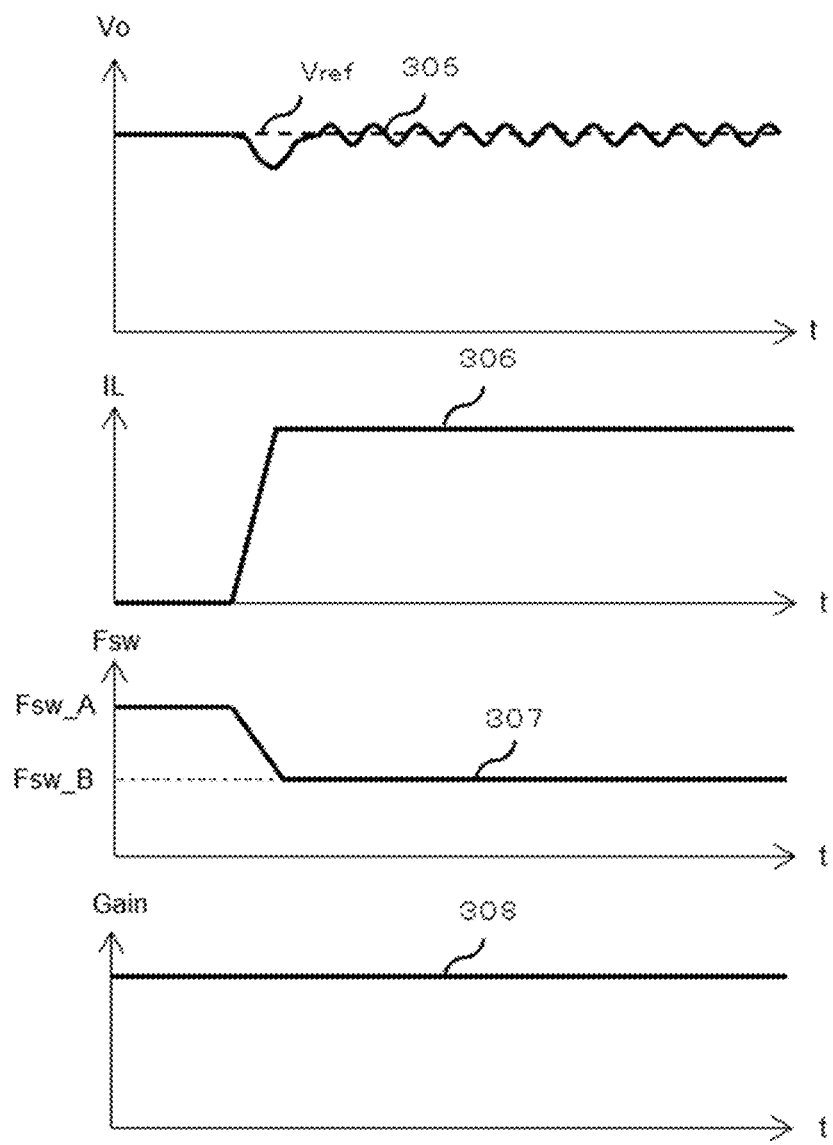
FIG. 3B is a view showing examples of a voltage, a current, and a switching frequency operation when the control gain is a constant value and has a value larger than that of FIG. 3A.

FIG. 3 (a) shows fluctuation of the output voltage Vo when the control gain is set to a certain constant value. For example, when a current flowing through the load 115 changes abruptly, electric charges in the output capacitor 109 decreases, so that the output voltage Vo becomes small. When the output voltage Vo fluctuates, a current control circuit controls the output voltage Vo so as to follow the reference voltage (Vref). However, since the control gain is low, a response until the switching frequency changes from Fsw_A to Fsw_B is slow. That is, when the control gain is low, an amount of variable in the switching frequency per unit time is small and the fluctuation of the output voltage Vo becomes large.

Since the control gain value in FIG. 3 (b) is higher than that in FIG. 3(a), a response until the switching frequency is changed to Fsw_B is quick. That is, when the control gain is high, the amount of variable in the switching frequency per unit time is large and the fluctuation of the output voltage Vo becomes small. Meanwhile, since the control gain is higher than that in FIG. 3(a), the output voltage Vo at a steady load is not stable and may oscillate.

Figure 4A:
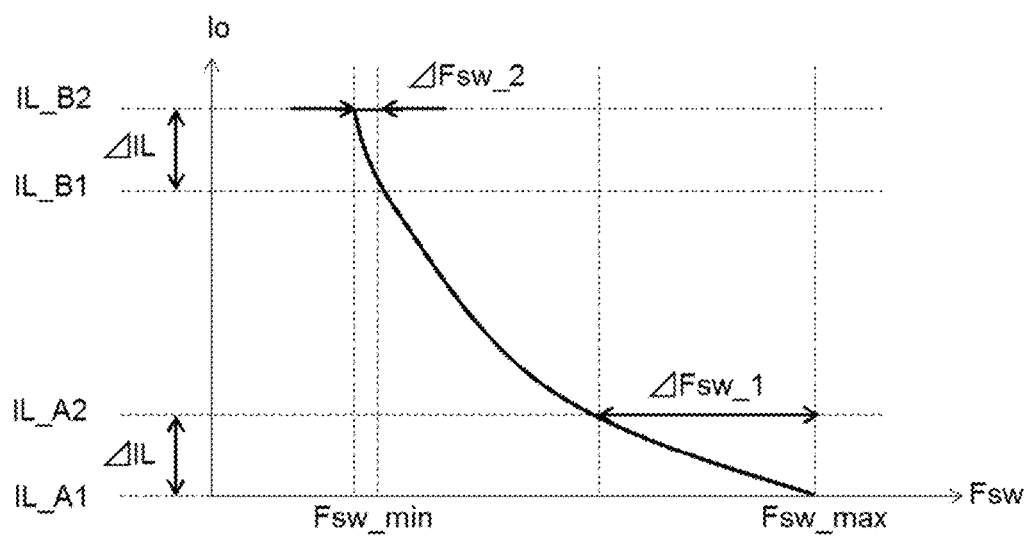
FIG. 4A is a view showing a relationship example of a switching frequency change amount depending on an output current amount in the resonance type power supply device.

FIG. 4(a) is a view obtained by measuring a relationship between the switching frequency and the output current IL in the resonance type power supply circuit whose gain is constant. FIG. 4(a) shows that when the output current fluctuates from IL_A1 to IL_A2 by an output current fluctuation amount (ΔIL), the amount of variable in the switching frequency is ΔFsw_1. Further, FIG. 4(a) shows that when the output current fluctuates from IL_B1 to IL_B2 by the output current fluctuation amount (ΔIL), the amount of variable in the switching frequency is ΔFsw_2. For the same output current fluctuation amount (ΔIL), it can be seen that FIG. 4 (a) has a relationship of ΔFsw_2<ΔFsw_1.

From FIG. 4(a), when the output current IL fluctuates in a small state, a change range of the switching frequency is large, so that a large control gain is required. Meanwhile, when the output current IL fluctuates in a large state, a change range of the switching frequency is small, so that it can be seen that a small control gain is sufficient. This relationship applies also about the voltage.

FIG. 4 (b) is a relationship diagram in which a horizontal axis is the switching frequency Fsw and a vertical axis is the control gain Gain set by the control quantity computing unit 111. The appropriate control gain of the switching frequency lower limit value (Fsw_min) is Gain_B, and the appropriate control gain of the switching frequency upper limit value (Fsw_min) is Gain_A. As can be seen from FIG. 4(a), it shows that the appropriate control gain also increases as the switching frequency (Fsw) increases.

Returning to FIG. 2, the control gain calculator 504 will be described. The control gain calculator 504 is a block that adjusts values of the voltage control gain and the current control gain each time by using the relationship between the switching frequency and the control gain described in FIGS. 3 and 4.

Specifically, the control gain calculator 504 computes preset initial values (AVRGain, ACRGain) of the voltage control gain and the current control gain so that the control gain varies in proportion to the switching frequency, and outputs them to the voltage controller 202 and the current controller 203.

Figure 4B:
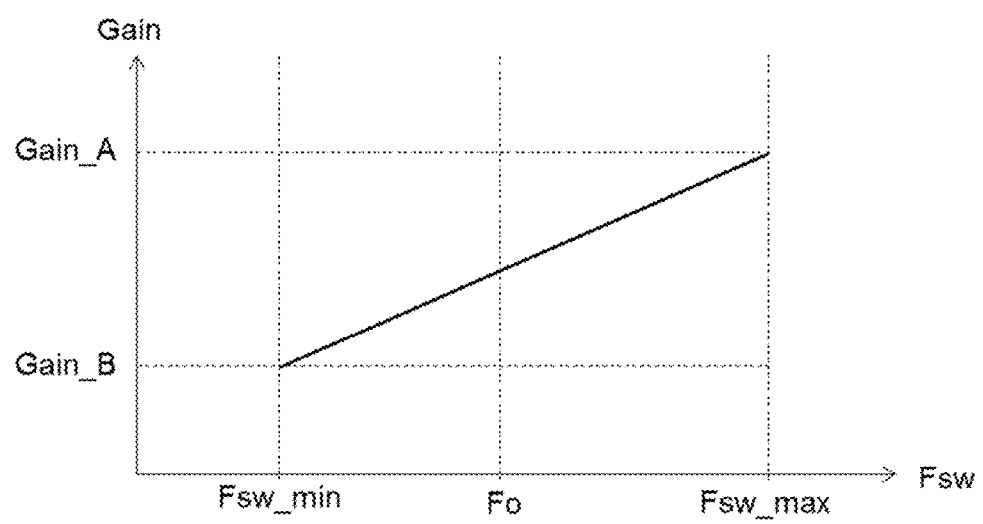
FIG. 4B is a view showing a relationship between the control gain and a switching frequency in the resonance type power supply device.

For example, when it is desired to change the control gain linearly (according to a linear function) as shown in FIG. 4(b), the control gain calculator stores (memorizes) as initial values the control gains corresponding to the switching frequency lower limit value (Fsw_min) and the switching frequency upper limit value (Fsw_min). The following relational expression (Equation 1) is derived from these four values.

$$\text{Gain} = \alpha * Fsw + \beta \qquad \text{(Equation 1)}$$

At this time, a slope α of a graph and a constant β are shown in (Equation 2).

$$\alpha = \frac{\text{Gain\_A} - \text{Gain\_B}}{\text{Fsw\_max} - \text{Fsw\_min}} \qquad \text{(Equation 2)}$$

$$\beta = \frac{(\text{Gain\_B} * \text{Fsw\_max}) - (\text{Gain\_A} * \text{Fsw\_min})}{\text{Fsw\_max} - \text{Fsw\_min}}$$

Use of a value of (Equation 2) rearranges (Equation 1) to (Equation 1').

$$\text{Gain} = \frac{(\text{Gain\_A} - \text{Gain\_B})}{(\text{Fsw\_max} - \text{Fsw\_min})} (Fsw - \text{Fsw\_min}) + \text{Gain\_B} \qquad \text{(Equation 1')}$$

Therefore, the control gain calculator 504 calculates a control gain by inputting, into (Equation 1'), a switching frequency Fsw immediately before outputted by a current converter 203. In the explanation, the above-mentioned control gain is a generic term, and so the control gain calculator 504 really performs an operation to each (or only one) of the voltage control gain (AVRGain) and the current control gain (ACRGain) and calculates a voltage control gain (AVRGain_set) or/and a current control gain (ACRGine_set).

In this embodiment, both the voltage control gain and the current control gain are calculated, but only one of the gains may be calculated and the other gain may be a constant value. Such a configuration as to control both of the gains depending on (according to) the switching frequency makes it possible to further enhance stability of the output voltage Vo.

Figure 5:
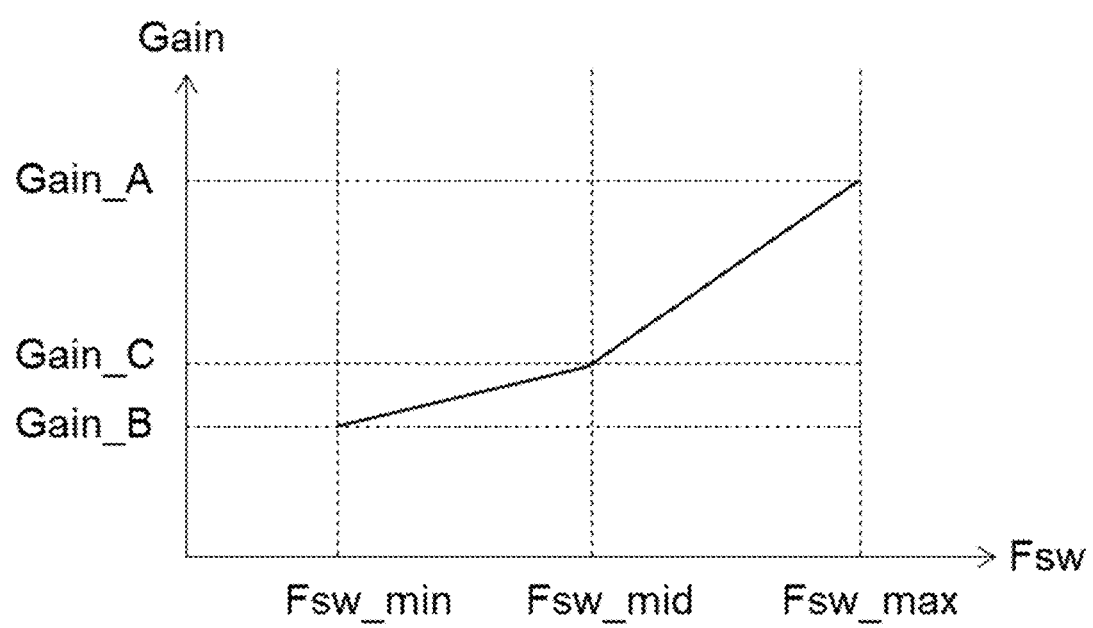
FIG. 5 is a view showing a relationship between a control gain and a switching frequency at each of three points in the resonance type power supply device.

Additionally, as shown in FIG. 5, a relationship between each of the switching frequencies of three or more points and each of the control gains of three or more points may be used. This case is realizable by switching (Equation 1') with a value of Fsw mid as a boundary.

Further, the relationship between the switching frequency and the control gain may be a proportional relationship, and does not necessarily have to be a linear function (straight line). For example, the control gain may be calculated by storing values of the switching frequencies of three or more points and values of the control gains of three or more points and using a function of quadratic or higher obtained by the least square method or the like instead of (Equation 1').

Additionally, in this embodiment, the control gain is calculated by inputting the switching frequency Fsw immediately before outputted by the current converter 203, but the switching frequency Fsw may be a value at the present time or earlier than immediately before (for example, a few clocks before). Further, the switching frequency Fsw may be a value obtained by performing a delay filter processing.

Alternatively, as shown in FIG. 6, the voltage control gains (AVRGainA to AVRGainE) and the current control gains (ACRGainA to ACRGineE) according to the relationship between the switching frequency and the control gain may be stored (saved) in a storage device in advance as a table and be used.

Figures 6A, 6B:
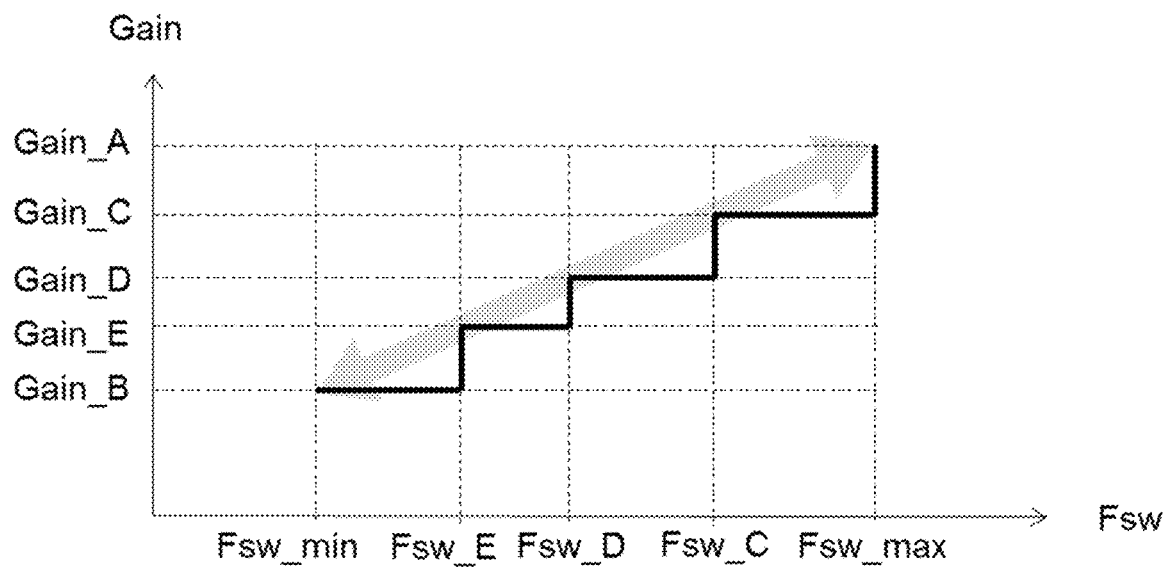
FIGS. 6A and 6B are diagrams for explaining a modification example of a control gain calculator according to an embodiment which applies the present invention.

FIG. 6(a) shows an image diagram in which the control gain increases stepwise in proportion to the switching frequency. At this time, each control gain is stored (memorized) as a table as shown in FIG. 6(b). The control gain calculator 504 selects a control gain depending on the switching frequency and outputs it to the voltage controller 202 and the current controller 203.

Figure 7:
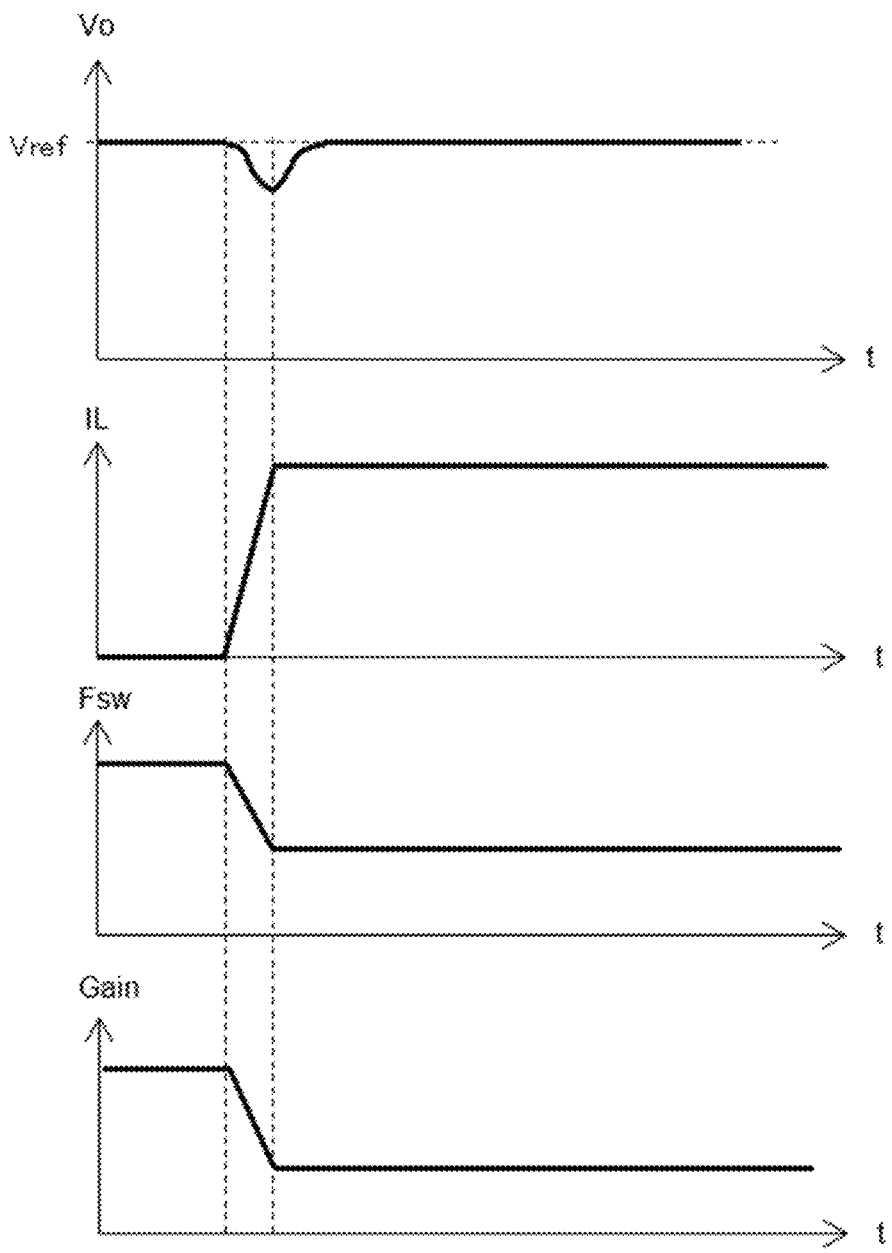
FIG. 7 is a view showing a waveform example in using the control gain calculator according to the embodiment which applies the present invention.

FIG. 7 shows a voltage fluctuation waveform when the output voltage is controlled by using a control quantity computing unit 511 of the present embodiment. When the output current (IL) flowing through the power supply main circuit 102 is small, the control gain is set high since the switching frequency is large.

Similar to FIG. 3, when the output current (IL) flowing through the power supply main circuit 102 suddenly flows greatly, the fluctuation of the output voltage is quickly changed to the switching frequency (Fsw_B) since the control gain is high, so that the fluctuation of the output voltage Vo is suppressed to be smaller than that in the case of FIG. 3(a). Additionally, as the switching frequency (Fsw) becomes smaller, the control gain also becomes smaller, so that the output voltage Vo at a steady load does not oscillate, which makes it possible to obtain stable power supply characteristics.

As described above, according to the embodiment which applies the present invention, changing the value of the control gain in proportion to the switching frequency brings suppression of large fluctuation and oscillation of the output voltage Vo and makes it possible to obtain the stable power supply characteristics.

Incidentally, the present invention is not limited to the above embodiment, and includes various modification examples. For example, the feedback control method may be P control, PI control, or PID control. In either case, a control gain conversion coefficient(s) may be multiplied by each (or one) of the finally multiplied current control gain and voltage control gain.

Additionally, the resonance type power supply device of the present invention may be configured independently or may be incorporated into various devices such as control ICs together with other component elements.

The above-described embodiment is an example for explaining the concept of the present invention and is not necessarily limited to an embodiment(s) including all the component elements described in the above embodiment.

Second Embodiment

Next, a second embodiment of the present invention will be described. In the present embodiment, shown is an example in which control is performed without using the output current (IL) detected by the resonance type power supply device 101 in each example of the above-described embodiment.

A resonance type power supply device 801 performs the same processing as that in FIG. 1, but detects a voltage between both electrodes of an output side capacitor 809 (voltage between the output terminals P3, P4) as the output voltage (Vo) and outputs information on the detected output voltage (Vo) to a power supply control block 803.

Figure 8:
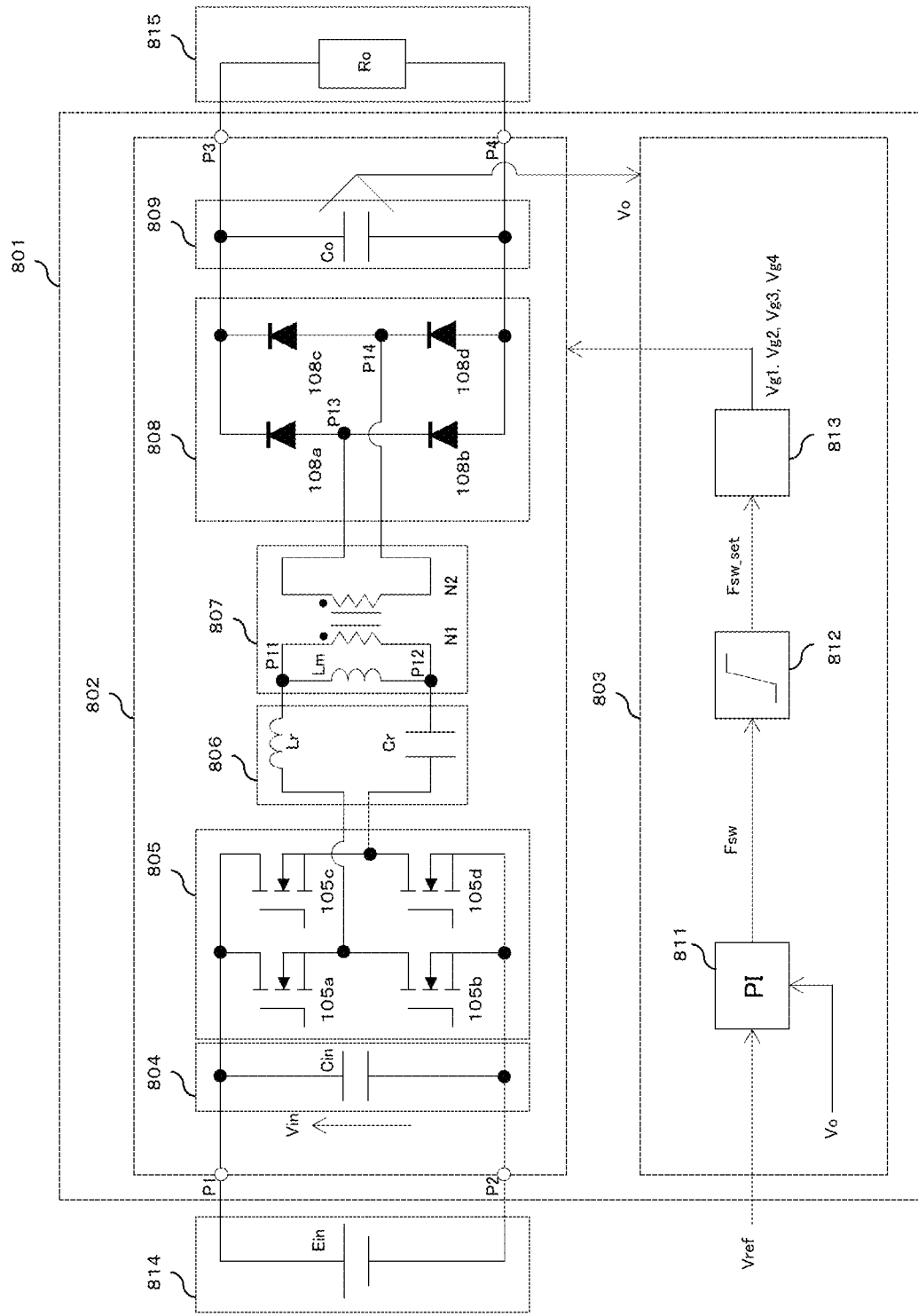
FIG. 8 is a view showing an example of a configuration of a resonance type power supply device according to a second embodiment of the present invention.
Figure 9:
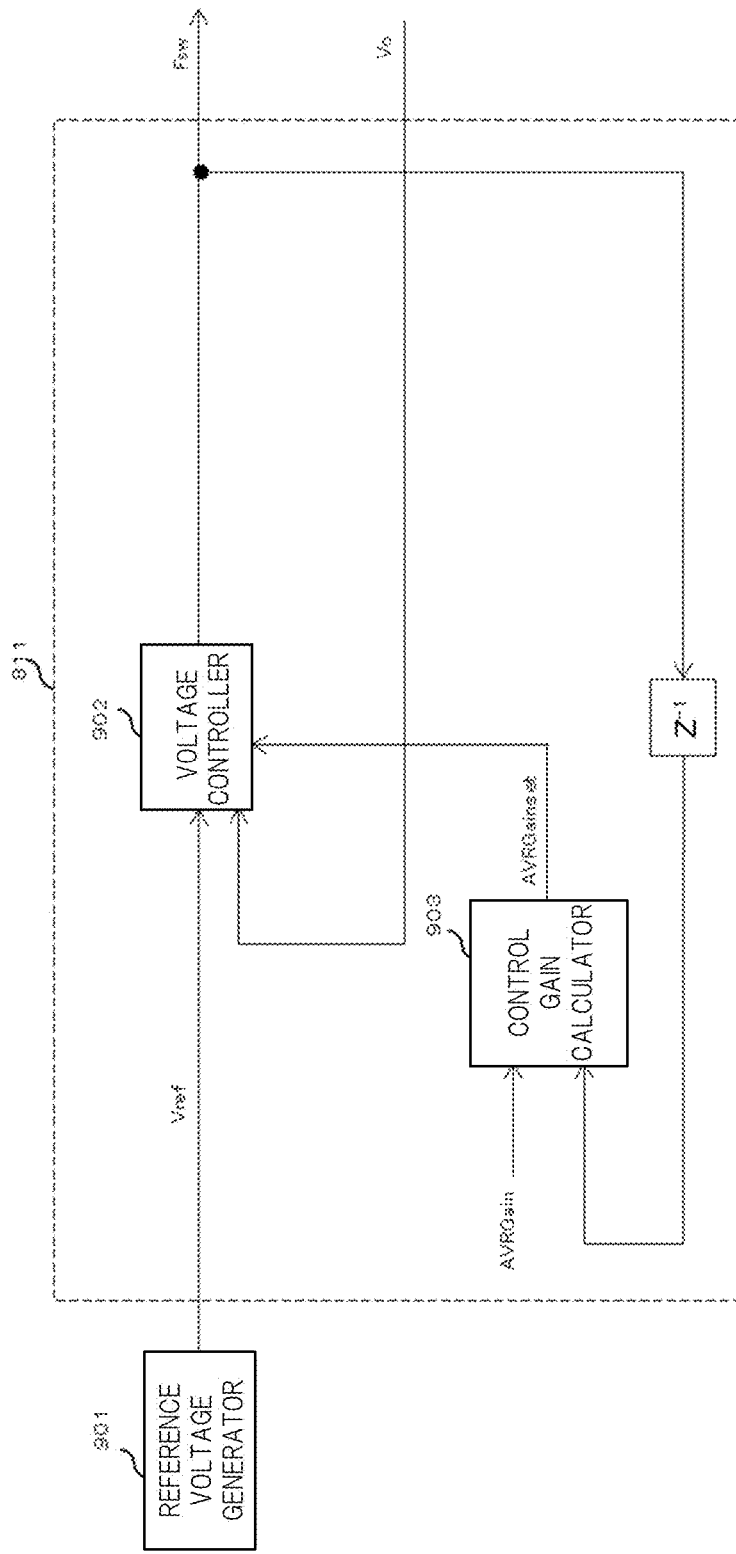
FIG. 9 is a diagram for explaining a control gain calculator of the resonance type power supply device according to the second embodiment of the present invention.

FIG. 9 is an example in which the control gain calculation is applied to the control quantity computing unit 811 shown in FIG. 8 in the same manner as in FIG. 2. A reference voltage generator 901 is the same as that of the first embodiment, and a control gain calculator 903 calculates only the voltage control gain. The method of calculating the gain is the same as that of the first embodiment.

The voltage controller 902 calculates the switching frequency (Fsw) from a voltage difference ($\Delta V$) between the reference voltage (Vref) and the inputted output voltage (Vo) and from the voltage control gain inputted from the control gain calculator 903. calculate.

Such a configuration makes it possible to reduce the current detection circuit and parameters required for the control and to provide a circuit that can be easily adjusted.

Third Embodiment

Next, a third embodiment of the present invention will be described. In the present embodiment, described will be a resonance type power supply device having a configuration different from that of the resonance type power supply device 101 in each of the above-described embodiments.

Figure 10:
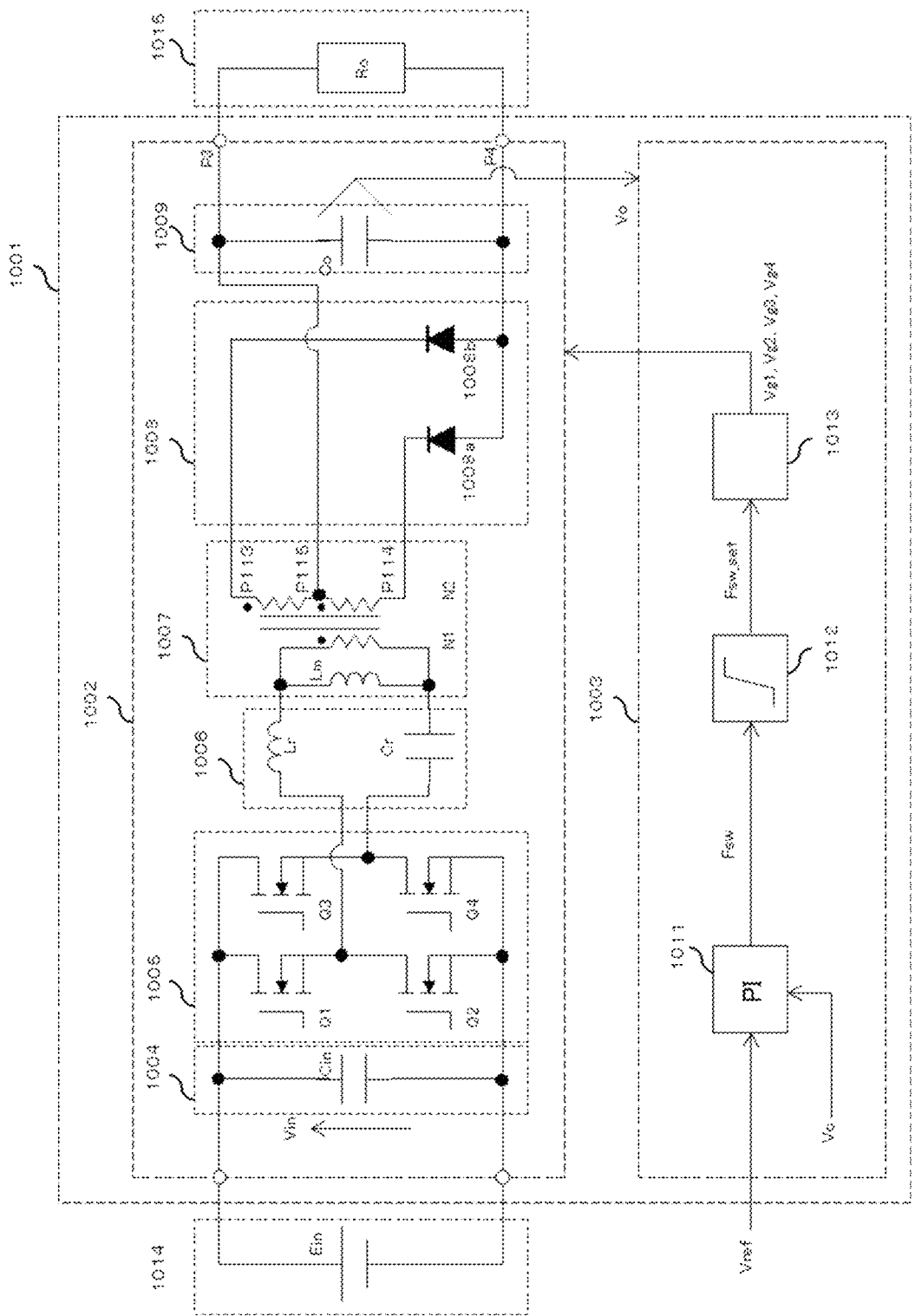
FIG. 10 is a view showing an example of a configuration of a resonance type power supply device according to a third embodiment of the present invention.

FIG. 10 is a view showing an example of a configuration of a resonance type power supply device according to a third embodiment of the present invention. As shown in FIG. 10, a resonance type power supply device 1001 includes a power supply main circuit 1002 and a power supply control circuit 1003. As shown in FIG. 10, the power supply main circuit 1002 includes a transformer 1007, a secondary side semiconductor element 1008, and the like.

The transformer 1007 is configured by a so-called center tap method. Specifically, as shown in FIG. 10, a center tap P115 is provided on a secondary side of the transformer 1007. That is, the transformer 1007 includes three output terminals P113, P114, P115. The configuration of the transformer 1007 other than these is the same as that of the transformer 107 shown in FIG. 1.

The secondary side semiconductor element 1008 is an element that rectifies a current on the secondary side of the transformer 1007. As shown in FIG. 10, the secondary side semiconductor element 1008 includes diodes 1008a, 1008b. For example, a cathode side end portion of the diode 1008a is connected to the output terminal P104 of the transformer 1007. A cathode side end portion of the diode 1008b is connected to the output terminal P113 of the transformer 1007. The output terminal P115 of the transformer 1007 is connected to one electrode of the output side capacitor 1008 and one output terminal P3 of the power supply main circuit 1002. An anode side end portion of the diode 1008a and an anode side end portion of the diode 1008b are connected to the other electrode of the output side capacitor 1009 and the other output terminal P4 of the power supply main circuit 1002.

When a voltage of the output terminal P115 is higher than a voltage of the output terminal P113, a current on the secondary side of the transformer 1007 is rectified by the diode 1008b. In contrast, when the voltage of the output terminal P115 is higher than a voltage of the output terminal P114, a current on the secondary side of the transformer 1007 is rectified by the diode 1008a.

Since the configuration of the power supply control circuit 1003 is the same as that of the second embodiment, a description thereof will be omitted.

Even in the resonance type power supply device 1001 provided with the center-tap type transformer 1007 as shown in FIG. 10, each effect in the above-described embodiments can be obtained.

Fourth Embodiment

Next, a fourth embodiment of the present invention will be described. In the present embodiment, described will be a resonance type power supply device having a configuration different from that of each of the above-described embodiments.

Figure 11:
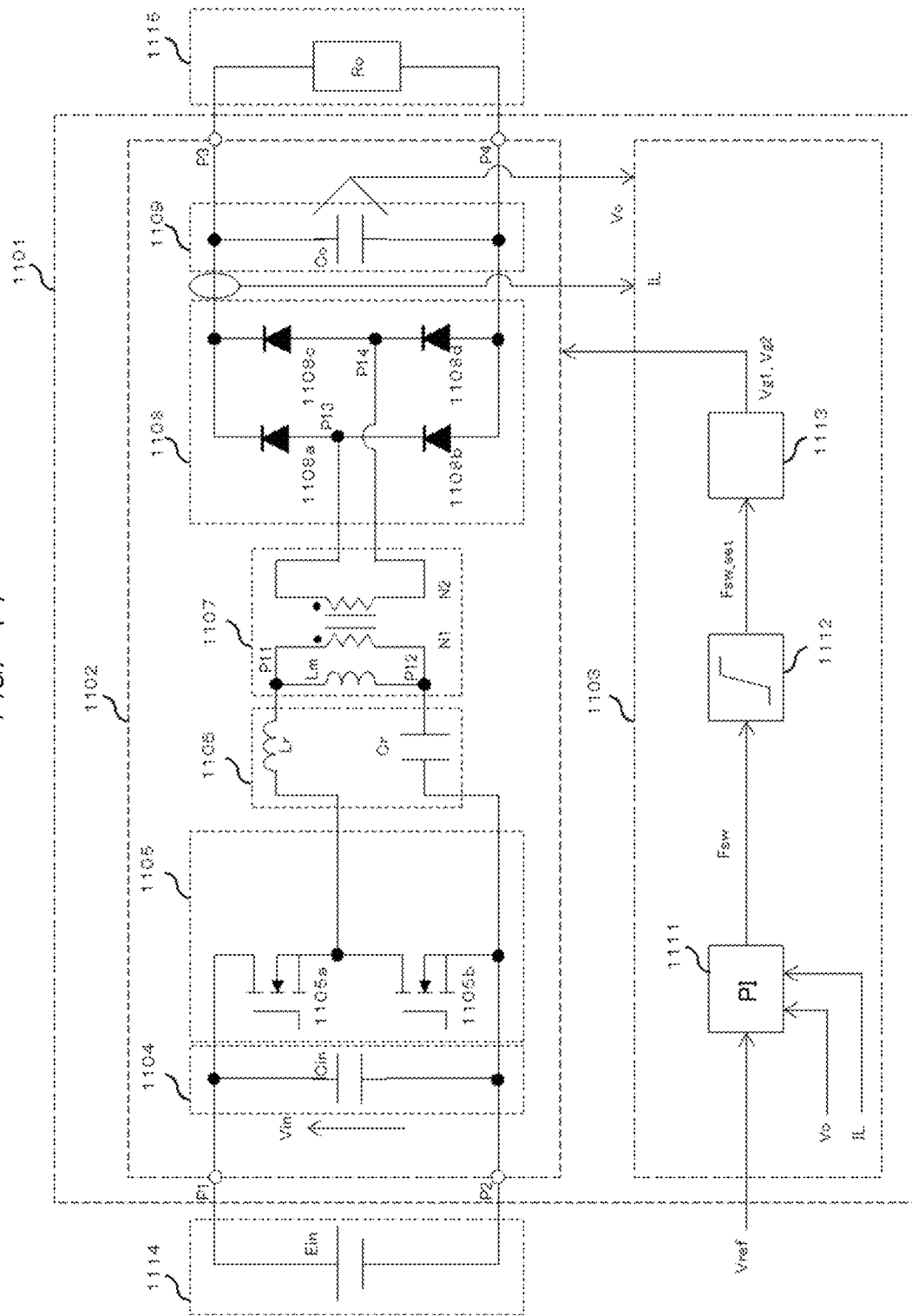
FIG. 11 is a view showing an example of a configuration of a resonance type power supply device according to a fourth embodiment of the present invention.

FIG. 11 is a view showing an example of a configuration of a resonance type power supply device according to a fourth embodiment of the present invention. As shown in FIG. 11, a resonance type power supply device 1101 includes a power supply main circuit 1102 and a power supply control circuit 1103. As shown in FIG. 11, the power supply main circuit 1102 includes a transformer 1107, a secondary side semiconductor element 1108, and the like.

A primary side semiconductor element 1105 switches a voltage inputted to a resonance element 1106 at a predetermined switching frequency. As shown in FIG. 1, the primary side semiconductor element 1105 is composed of a plurality of switching elements 105a to 105b each made of a MOS-FET such as an NMOS (N-Channel MOS).

For example, as shown in FIG. 11, one end portion of the switching element 1105a is connected to one input terminal P1 of the power supply main circuit 1102. As shown in FIG. 11, one end portion of the switching element 1105b is connected to the other input terminal P2 of the power supply main circuit 1102 and the resonance capacitor 1106b of the resonance element 1106. The other end portion of the switching element 1105a and the other end portion of the switching element 1105b are connected to the resonance inductor 1106a of the resonance element 1106. Gates of the switching elements 1105a to 1105b is connected to a switching control signal generator 1113 described later, respectively.

The gates of the switching elements 1105a to 1105b are switched on and off by the switching control signals Vg1 to Vg2 outputted from the power supply control circuit 1103 based on the switching control signals Vg1 to Vg42 corresponding thereto. For example, if the switching element is composed of an NMOS, the switching element becomes an on-state (is turned on) when a high-level switching control signal is inputted to the gate. Meanwhile, when a low-level switching control signal is inputted to the gate, the switching element becomes an off-state (is turned off).

Since the power supply control circuit 1103 has the same configuration as that of the first embodiment, a description thereof will be omitted.

Even in the resonance type power supply device 1101 as shown in FIG. 11, each effect in the above-described embodiments can be obtained.

Fifth Embodiment

Next, a fifth Embodiment of the present invention will be described. In the present embodiment, described will be a resonance type power supply device having a configuration different from that of the relationship between the control gain and the switching frequency described above.

Figure 12A:
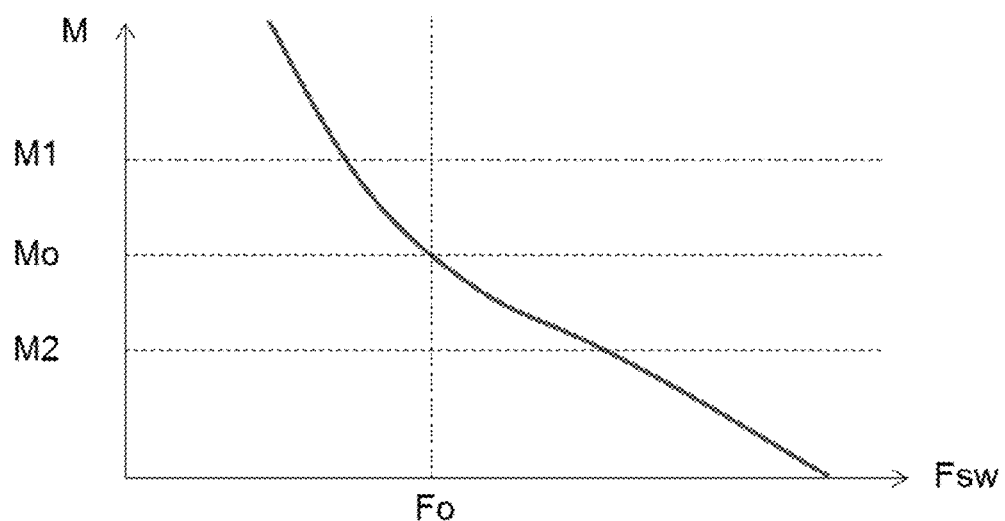
FIG. 12A is a view showing a relationship between a circuit gain M and a switching frequency according to a fifth embodiment of the present invention, the circuit gain M being calculated from the number of turns on a primary side and a secondary side of a transformer, an input voltage, and an output voltage.

FIG. 12(a) is a view showing an example of frequency characteristics of a resonance type power supply device, in which a vertical axis represents a circuit gain M and a horizontal axis represents a frequency. Here, a circuit gain M is a value defined by the following equation 3 based on an input voltage Vin, an output voltage (Vo), and coil turns N1, N2 on the primary and secondary sides of the transformer 14.

$$Vo = M \cdot (N2/N1) \cdot Vin \quad \text{(Equation 3)}$$

From FIG. 12 (a), the switching frequency Fsw decreases as the circuit gain M increases, that is, the circuit gain M and the switching frequency Fsw are in an inversely proportional relationship.

Figure 12B:
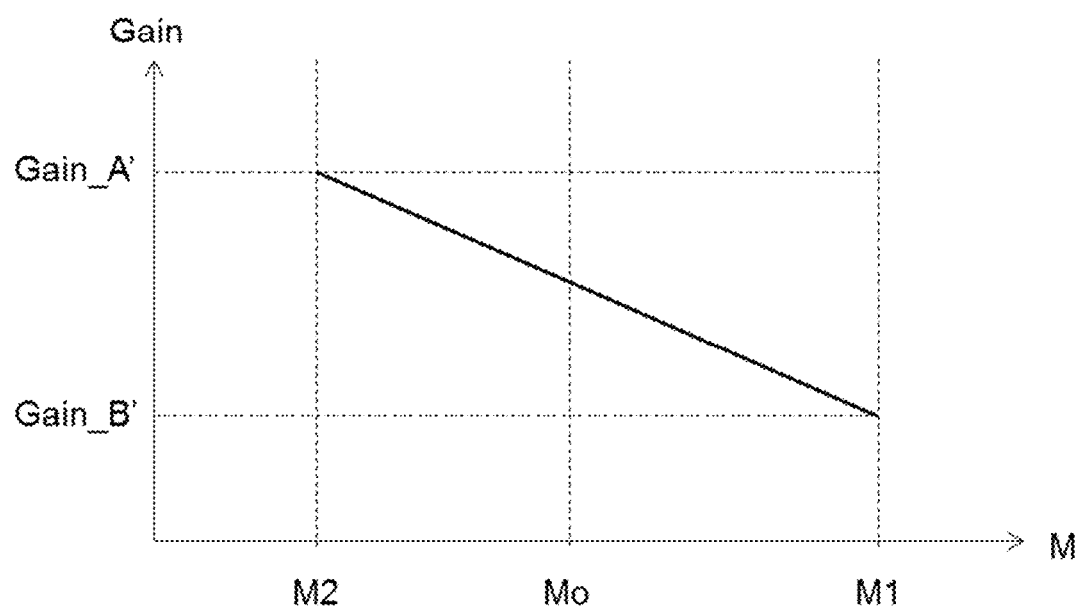
FIG. 12B is a view showing a relationship between a control gain and a circuit gain M according to the fifth embodiment of the present invention.

Therefore, when the relationship between the circuit gain M and the control gain is expressed as shown in FIG. 4(b), a relationship shown in FIG. 12(b) is established. This makes it possible to calculate the control gain by using the circuit gain instead of the switching frequency.

For example, as a control gain GainA' when the circuit gain in the configuration of FIG. 1 is the minimum value M2 and as a control gain GainB' when the circuit gain therein is the maximum value M1, the circuit gain M is calculated from (Equation 3) by inputting the input voltage (Vin) of the power supply main circuit 102 to the power supply control circuit 103, which makes it possible to calculate a control gain by (Equation 4), (Equation 4'), and (Equation 5) according to the circuit gain M.

$$\text{Gain} = \alpha' * M + \beta' \quad \text{(Equation 4)}$$

$$\alpha = \frac{\text{Gain\_B}' - \text{Gain\_A}'}{M1 - M2} \quad \text{(Equation 5)}$$

$$\beta = \frac{(\text{Gain\_A}' * M1) - (\text{Gain\_B}' * M2)}{M1 - M2}$$

-continued $$\text{Gain} = \frac{(\text{Gain\_B}' - \text{Gain\_A}')}{(M1 - M2)}(M - M2) + \text{Gain\_A}' \quad \text{(Equation 6)}$$

In this way, even if the switching frequency Fsw itself is not used, the control gain can be calculated by using another variable (circuit gain M in the present embodiment) obtained from the switching frequency Fsw.

EXPLANATION OF REFERENCE SYMBOLS

101 . . . Resonance power type supply device; 102 . . . Power supply main circuit; 104 . . . Input side capacitor; 108 . . . Primary side semiconductor element; 105a to 105d . . . Switching element; 106 . . . Resonance element; 107 . . . Transformer; 108 . . . Secondary side semiconductor element; 108a to 108d . . . Diode; 109 . . . Output side capacitor; 103 . . . Power supply control circuit; 111 . . . Control quantity computing unit; 112 . . . Switching frequency upper and lower limit value adjuster; 113 . . . Switching control signal generator; Vg1 to Vg4 . . . Switching element control signal; 114 . . . Input power supply; and 115 . . . Load.

The invention claimed is:

1. A resonance type power supply device comprising:
a power supply main circuit having a transformer, a resonance element connected on a primary side of the transformer, and a plurality of switching elements connected to the resonance element; and
a power supply control circuit switching the plurality of switching elements in the power supply main circuit with a predetermined switching frequency,
wherein the power supply control circuit includes:
a voltage controller outputting a current command value from a reference voltage, an output voltage of the power supply main circuit, and a voltage control gain;
a current controller calculating a reference current, a current flowing on a secondary side of the transformer, and a current control gain;
a gain calculator outputting the voltage control gain and the current control gain; and
a control signal generator controlling the plurality of switching elements based on the switching frequency outputted by the current controller, and
the gain calculator outputs the voltage control gain or current control gain that is proportional to the switching frequency outputted by the current controller.

2. The resonance type power supply device according to claim 1,
wherein the gain calculator changes a value of the voltage control gain or current control gain based on the switching frequency immediately before outputted by the voltage controller or current controller.

3. The resonance type power supply device according to claim 1,
wherein the gain calculator outputs the voltage control gain and the current control gain that are proportional to the switching frequency.

4. The resonance type power supply device according to claim 1,
wherein the power supply control circuit determines whether the switching frequency outputted by the current controller is within a predetermined range, and
the power supply control circuit corrects the switching frequency to output it to the control signal generator when the switching frequency outputted by the current controller is not within the predetermined range.

5. The resonance type power supply device according to claim 1,
wherein the gain calculator changes a value of the voltage control gain or current control gain based on the switching frequency immediately before outputted by the voltage controller or current controller.

6. The resonance type power supply device according to claim 1,
wherein the power supply control circuit determines whether the switching frequency outputted by the current controller is within a predetermined range, and
the power supply control circuit corrects the switching frequency to output it to the control signal generator when the switching frequency outputted by the current controller is not within the predetermined range.

* * * * *